(12) United States Patent
Primavera et al.

(10) Patent No.: US 11,213,830 B2
(45) Date of Patent: Jan. 4, 2022

(54) PLANT AND METHOD FOR RECOVERING AND TREATING RESIDUES FROM CRUSHING FERROUS SCRAP

(71) Applicant: DANIELI & C. OFFICINE MECCANICHE S.P.A., Buttrio (IT)

(72) Inventors: Alessandra Primavera, Faedis (IT); Selena Tiburzio, Cervignano del Friuli (IT); Davide Braga, Adria (IT); Hans Rudolf Gutknecht, Edlibach (CH)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 51 days.

(21) Appl. No.: 15/759,616

(22) PCT Filed: Sep. 14, 2016

(86) PCT No.: PCT/IB2016/055463
§ 371 (c)(1),
(2) Date: Mar. 13, 2018

(87) PCT Pub. No.: WO2017/046708
PCT Pub. Date: Mar. 23, 2017

(65) Prior Publication Data
US 2019/0046992 A1  Feb. 14, 2019

(30) Foreign Application Priority Data

Sep. 14, 2015 (IT) .......................... 102015000051336

(51) Int. Cl.
*B03B 9/06* (2006.01)
*C22B 1/14* (2006.01)
(Continued)

(52) U.S. Cl.
CPC ................ *B03B 9/061* (2013.01); *C22B 1/14* (2013.01); *C22B 7/005* (2013.01);
(Continued)

(58) Field of Classification Search
CPC ..... B03B 9/06; B03B 9/061; B03B 2009/068; B02C 23/10; B02C 23/14; B29B 17/02;
(Continued)

(56) References Cited

U.S. PATENT DOCUMENTS 3,790,091 A * 2/1974 Law .......................... B03B 9/06
                                                                    241/19
4,844,351 A * 7/1989 Holloway ................. B03B 9/06
                                                                    241/14
(Continued)

FOREIGN PATENT DOCUMENTS

EP    1013778 A1    6/2000
EP    1333931 A1    8/2003

OTHER PUBLICATIONS

Int'l Preliminary Report on Patentability dated Mar. 14, 2018 in Int'l Application No. PCT/IB2016/055463.
(Continued)

*Primary Examiner* — Joseph C Rodriguez
(74) *Attorney, Agent, or Firm* — Panitch Schwarze Belisario & Nadel LLP

(57) ABSTRACT

A plant for recovering and treating residues from crushing scrap is provided. The plant includes a first plant part and a second plant part. The first plant part is provided with crushing and separation means configured to extract ferrous materials, non-ferrous metals and plastic materials from the residues from crushing. The separation means are provided with a granulator system configured to reduce, in dry mode and without pre-screening stages, the residues from crushing into a stream of granular material. The second plant part is provided with means to treat and size the plastic materials configured to transform the plastic materials into additive material to be used, in particular, in iron and steel plants such as blast furnaces, electric arc furnaces or suchlike. The
(Continued)

means to treat and size the plastic materials includes a dry system for cutting and/or grinding the plastic materials.

10 Claims, 1 Drawing Sheet

(51) Int. Cl.
 *C22B 7/00* (2006.01)
 *B29B 17/02* (2006.01)
 *B29B 17/04* (2006.01)
 *B29L 31/30* (2006.01)
(52) U.S. Cl.
 CPC ......... *B03B 2009/068* (2013.01); *B29B 17/02* (2013.01); *B29B 17/04* (2013.01); *B29B 2017/0217* (2013.01); *B29B 2017/0268* (2013.01); *B29B 2017/0272* (2013.01); *B29L 2031/3055* (2013.01); *Y02P 10/20* (2015.11); *Y02W 30/52* (2015.05); *Y02W 30/62* (2015.05)
(58) Field of Classification Search
 CPC .. C22B 7/005; C22B 1/14; C22B 1/24; C22B 1/2406
 See application file for complete search history.

(56) References Cited

U.S. PATENT DOCUMENTS

| | | | | | |
|---|---|---|---|---|---|
| 5,080,291 | A | * | 1/1992 | Bloom | B03B 9/061 241/101.8 |
| 5,314,072 | A | * | 5/1994 | Frankel | B07C 5/3408 209/44.1 |
| 5,443,157 | A | * | 8/1995 | Baker | B03B 9/061 209/12.1 |
| 5,503,788 | A | * | 4/1996 | Lazareck | B29B 17/02 264/115 |
| 5,535,891 | A | * | 7/1996 | Kuniyone | B03B 5/36 209/12.1 |
| 6,070,733 | A | * | 6/2000 | Osing | B03B 1/04 209/214 |
| 6,086,000 | A | * | 7/2000 | Murata | B03B 9/061 241/19 |
| 6,136,590 | A | * | 10/2000 | Kruse | B03B 9/06 435/262 |
| 6,578,783 | B2 | * | 6/2003 | Simon | B03B 9/061 209/12.1 |
| 7,389,880 | B2 | * | 6/2008 | Goldmann | B03B 9/061 209/12.1 |
| 8,267,336 | B2 | * | 9/2012 | Goldmann | B03B 9/061 241/101.2 |
| 8,556,201 | B2 | * | 10/2013 | Knust | C22B 7/005 241/79 |
| 8,627,960 | B2 | * | 1/2014 | Valerio | B07B 7/01 209/139.1 |
| 9,132,432 | B2 | * | 9/2015 | Andersen | B03B 9/061 |
| 2008/0257794 | A1 | | 10/2008 | Valerio | |
| 2011/0017644 | A1 | * | 1/2011 | Valerio | B07C 5/344 209/38 |

OTHER PUBLICATIONS

Int'l Search Report and Written Opinion dated Dec. 23, 2016 in Int'l Application No. PCT/IB2016/055463.

\* cited by examiner

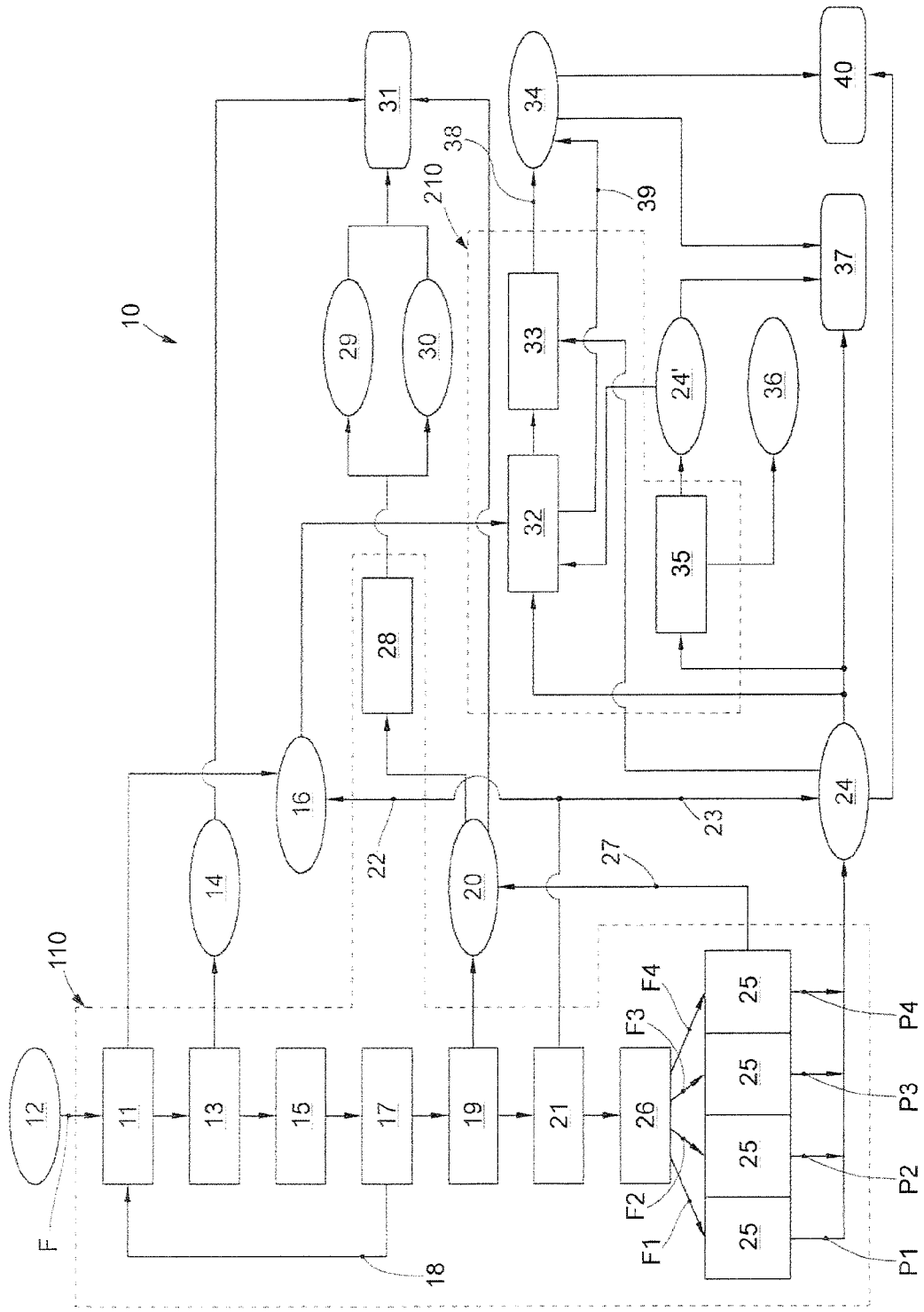

PLANT AND METHOD FOR RECOVERING AND TREATING RESIDUES FROM CRUSHING FERROUS SCRAP

CROSS-REFERENCE TO RELATED APPLICATION

This application is a Section 371 of International Application No. PCT/IB2016/055463, filed Sep. 14, 2016, which was published in the English language on Mar. 23, 2017, under International Publication No. WO 2017/046708 A1, and which claims priority to Italian Patent Application No. 102015000051336, filed on Sep. 14, 2015, and the disclosures of which are incorporated herein by reference.

FIELD OF THE INVENTION

The present invention concerns the field of crushing and treating ferrous scrap, for example the treatment of scrap from the automobile sector.

The present invention concerns in particular a method and a plant for recovering and treating residues from crushing scrap by means of which it is possible to extract from said residues, in an extremely efficient way, the ferrous materials, non-ferrous metals and in particular plastic materials, which can be used depending on their chemical composition as recycling materials, as fuel or reducing agent in steel-making plants such as blast furnaces, electric arc furnaces or suchlike.

By the term plastic materials we mean light plastic materials, heavy plastic materials, rubbers, fibers and polymers in general.

BACKGROUND OF THE INVENTION

As is known, medium-size and large-size plants for crushing scrap exist, for example scrap from automobiles or vehicles in general, which comprise crushing machines into which the vehicles are introduced to be subjected to a crushing or shredding process. At exit from the crushing machines, a mass of residual material is obtained, known as Fluff, SR (Shredder Residue) or ASR (Automotive Shredder Residue).

The residual material has a high calorific power, more than 13000 kJ/kg, and generally consists of a mixture of:

plastic materials, rubbers, fibers and polymers in general (more than 80% of the total of materials present);

ferrous metals, for example carbon steel and stainless steel, and non-ferrous metals, mainly Cu and Al, (equal to about 10%); and inert materials, such as glass and reinforcers of the polymers (mainly CaO, MgO, silicates).

Currently, different technologies are known to try to recover the residual SR and ASR material. For example, gasification processes are known, or pyrolysis of the ASR material for subsequent energy recovery or the generation of fuels: in this category we find production plants for syn-gas and for liquid, solid and gaseous hydrocarbons.

Such plants have various disadvantages: first of all, they are very complex plants, especially with regard to cleaning the gas or treating the fumes; moreover, such plants always produce a fraction of potential heavy metal loaded residues to be taken to the dump. Furthermore, it is very complex to recover the metals, mainly because such metals are oxidized during treatment at high temperatures.

Technologies are also known which use ASR material to partly replace carbon in electric arc furnaces (EAF) for the production of steel. Experiments have been carried out regarding the feed of ASR material in the form of briquettes both into electric arc furnaces for the production of steel, and also into blast furnaces (BF), but these are always very small quantities of material because the ASR not only contains a carbon-rich fraction, but also non-ferrous metals, such as copper for example, which cannot be fed in great concentrations into the EAF because it would cause defects in the steel product. With regard to the blast furnace too, the quantity of ASR material is limited by problems of damage to the blast furnace refractories, emission of pollutants and corrosion of the plants.

Processes for the mechanical separation of the metals from ASR material are also known, where the fraction of plastic materials, both light and heavy, is sent to incinerators, lime production plants or dumps. In these types of plants, even if they have some advantages with regard to recovering the metal materials, a quantity of ASR material remains, more than 80%, which has to be disposed of (in cement factories, dumps or incinerators), with obvious very high management costs and waste of potential quantities of energy.

Plants are also known for sorting the ASR fractions, able to recover mainly the fractions of ferrous metals. Caused by the heterogeneous compilation of the SR and ASR materials, such plants do divide up the material stream into different size ranges first before any treatment of the fractions can begin Each fraction constitutes a single treatment line with the different machines (magnetic separators, induced current separators) repeated for each line. This solution is particularly complex and costly, given the numerous plant components required.

Document US 2008/257794 A1 describes a complex method and corresponding plant for separating and recovering plastic materials, copper cables and other non-ferrous materials from discard materials or waste. In the plant, a meticulous separation and cleaning of the plastic materials is required. The meticulous separation and cleaning of the plastic materials is necessary so that they can be recycled and subsequently put onto the market.

In order to separate and clean meticulously the different types of plastic materials obtainable, the plant described in document US 2008/257794 A1 uses various complex grinding steps combined with separation steps using water.

The use of separation steps with water makes it unsuitable to use the plastic materials obtained by this plant for use as additive material, for example as fuel, in an iron and steel plant, given the high risk of developing hydrogen and triggering dangerous explosions.

Another disadvantage of this plant, as well as its complexity and unsuitability for obtaining additives for iron and steel plants, is the need to treat and dispose of the waste water deriving from the separation process of the plastic materials.

One purpose of the present invention is therefore to overcome the disadvantages of the known technologies and plants cited above, and to obtain a plant for recovering and treating residues from crushing scrap which allows to separate effectively the various components of the ASR material so that, merely by way of example, the fraction that has to be taken to the dump or disposed of is zero, or at most no higher than 5% in weight with respect to the total.

Another purpose of the present invention is to obtain a plant for recovering and treating residues from crushing scrap which allows to use mixed plastic materials, both light and heavy, deriving from the ASR separation process, to make an additive material, for example to function as fuel or reducing agent, able to be fed efficiently into a furnace for the production of steel, for example an electric arc furnace, so as to at least partly replace traditional feed of metallurgical coke into the furnace.

Another purpose of the present invention is to obtain a plant for recovering and treating residues from crushing scrap which advantageously provides limited crushing operations and which actuates a method for recovering and treating residues from crushing scrap made in dry mode, therefore without needing to use separators that require the use of water or other fluids.

Another purpose of the present invention is to perfect an efficient method to recover and treat residues from crushing scrap.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a plant for recovering and treating residues from crushing scrap is characterized in that it comprises a first plant part provided with crushing/disintegrating and separation means configured to extract, that is, to separate from each other, ferrous materials, non-ferrous metals and mixed plastic materials from said residues from crushing; the crushing and separation means are provided with a granulator system, configured to reduce, in dry mode and without pre-screening stages, the residues from crushing into a stream of granular material; and a second plant part provided with means to treat and size the mixed plastic materials configured to transform the mixed plastic material into additive material, to function for example as a fuel or reducing agent, to be used, in particular, in iron and steel plants such as blast furnaces, electric arc furnaces or suchlike; said means to treat and size the plastic materials comprise a dry system for cutting and/or grinding the plastic materials.

Substantially, in the present plant a grinding step suitable to crush, disintegrate and separate all the raw materials is advantageously performed as a first step. Crushing/disintegrating and separating means produce a fraction immediately, which is downsized and homogenized in size, the composite material is split and disintegrated into its structure and the metals are deformed to a granulate. This step enables to separate all the different material easily and cleanly from each other on the further downstream part of the plant: ferrous materials and non-ferrous metals, plastic material mix and fiber material mix. The fractions of plastic and fiber mix can be passed onto a next process step with means to either sort recyclable plastic fraction from the mix or to treat and size the mixed plastic materials in order to transform them into additive material, to function for example as a fuel or reducing agent, to be used, in particular, in iron and steel plants such as blast furnaces, electric arc furnaces or suchlike.

Advantageously, therefore, using the present plant, it is possible to separate efficiently the main components of ASR residues from crushing scrap, in particular, ferrous materials, non-ferrous metals and plastic materials. Once they have been suitably prepared and sized, the plastic materials can be introduced directly into a suitable combustion system, or iron and steel plant, such as a blast furnace, an electric arc furnace or suchlike.

Advantageously, moreover, the present plant is extremely compact, requires limiting crushing steps of the residues of scrap crushing, for example one step for each of the two plant parts, and furthermore the plastic material obtained can be used in safety as additive material, for example as fuel and reducing agent, in iron and steel plants.

The cutting and/or grinding system can also be applied to heavy plastic materials and briquettes, so as to have a material with a controlled granulometry, suitable for its subsequent application, in particular in an iron and steel plant.

According to another aspect of the invention, the present plant comprises:

one or more magnetic separation apparatuses configured to separate the ferrous materials from the stream of granular material;

one or more systems of separation by density, for example using streams of air, configured to remove light plastic materials, such as textiles, polyurethane foams, and possibly also paper, cardboard or other materials from said stream of granular material;

one or more induced current systems configured to separate non-ferrous metals from the stream of granular material;

one or more screening systems configured to extract heavy plastic materials from the stream of granular material.

According to a possible variant, the screening system can include one or more systems to separate the scrap according to size/density, configured to separate the heavy plastics, mainly comprising rubbers, polypropylene, polyethylene, resins, acrylonitrile butadiene styrene, polycarbonate, polystyrene, polyethylene terephthalate, etc., and one or more gravimetric and/or colorimetric screening and/or separation systems, or with spectroscopic sensors configured to separate the different plastic materials according to size, weight and composition (with and without chlorine).

According to another aspect of the invention, the second plant part comprises a thermomechanical transformation system of the plastic and the fiber materials so as to produce dense briquettes without external heating of the material.

The present invention also concerns a method for recovering and treating residues from crushing scrap, characterized in that it comprises sequential steps of dry workings, in particular: one or more first sequential steps of crushing and separating the residues from crushing, able to extract ferrous materials, non-ferrous metals and plastic materials from the residues from crushing, and one or more second steps of treating and sizing the plastic materials extracted from the residues from crushing able to transform the plastic materials into additive material, to function for example as a fuel or reducing agent, to be used in particular in iron and steel plants such as blast furnaces, electric arc furnaces or suchlike.

BRIEF DESCRIPTION OF THE DRAWING

These and other characteristics of the present invention will become apparent from the following description of some forms of embodiment, given as a non-restrictive example with reference to the attached drawing wherein:

FIG. 1 is a block diagram showing the plant and method for recovering and treating residues from crushing scrap according to the present invention.

DETAILED DESCRIPTION OF SOME FORMS OF EMBODIMENT

With reference to FIG. 1 of the attached drawing, a plant for recovering and treating residues from crushing ferrous scrap according to the present invention is shown schematically with the reference number 10. The plant 10 substantially comprises a first plant part 110 for separating residues from crushing scrap, for example ASR material 12, into its main components, and a second plant part 210 for the preparation and sizing of the plastic materials to be sent to an iron and steel plant 40 such as a blast furnace, electric arc furnace or suchlike Although hereafter in the description we shall refer to the specific application of an electric arc furnace 40, the same considerations can also refer in general to iron and steel plants.

The first plant part 110 regarding the separation and sorting of materials substantially comprises a single treatment line.

As the first element in said treatment line, a crushing or granulator system is provided, represented symbolically by block 11. Preferably, in the first plant part 110 a single crushing or granulator system 11 is provided. The granulator system 11 can be for example a mill with a vertical rotor and rotary star cams, by means of which all the ASR material 12 is crushed, without any prior screening, to a size that optimizes the recovery of the different fractions. The size of the granulated material can be comprised between 0 and 30 mm, preferably between 0 and 20 mm. The function of the granulator system 11 is therefore to reduce the size of the material, both through a mechanism that disintegrates the materials, which implies separating the different constituents of a composite material, such as metal cables, and also by granulating the fractions of metal and hard plastics.

During this first step of size reduction, as a consequence of the reciprocal friction mechanisms between the materials, the latter heat up, promoting the reduction in residual humidity. Therefore, a stream F of mixed granular material, with a size and density suitable for the subsequent treatments, comes out from the granulator system 11.

Downstream of the granulator system 11 a magnetic separation system 13 is provided, able to separate the fraction of ferrous materials 14 from the rest of the stream F of granular material. The magnetic separation system 13 can be any known system, for example a magnetic system with a belt or drum.

Downstream of the magnetic separation system 13 a separation by density system 15 is provided, for example using a jet of air, which, after the step of magnetic separation using the magnetic separation system 13, or even already in the shredding step, is used to remove light plastic materials 16, possibly also in the form of fibers, from the stream F of granular material.

By means of the magnetic separation system 13 and the separation by density system 15, a first stage of density/size separation is implemented, to remove most of the light plastic materials 16, also in the form of fibers, which have already been disintegrated. The heavier fraction exiting from the granulator system 11 and the magnetic separation system 13 is sent to a first screening device 17.

According to a possible solution, material with unsuitable sizes, for example more than 20 mm, can be recirculated to the granulator system 11, line 18, while material with suitable sizes, for example less than 20 mm, is sent to an induced current separation system 19. The purpose of the induced current separation system 19 is to separate components or fractions of non-ferrous metals 20 from the main current of ASR material being treated. The induced current separation system 19 is able to produce a clean expelled fraction, for example aluminum, based on the settings of the machine, and a remaining mixed fraction which includes plastic mixed material and copper.

After the induced current separation system 19 the plant 10 according to the present invention can provide another separation by density system 21, for example using a stream of air by means of which it is possible to separate from the main stream of material another fraction of light plastic materials 16, line 22, or a fraction of plastic materials classifiable as heavy or hard, hereafter referred to as heavy or hard plastic materials 24, line 23. The main fraction exiting from the separation by density system 21 consists mainly of heavy plastic materials and non-ferrous metals.

Downstream of the separation by density system 21 a multi-stage screening system 26 is provided, by means of which a plurality of fractions of materials is obtained. For example at least three fractions of materials having a homogeneous size, each of which is subjected to a stage of separation according to size/density on a mechanic/pneumatic sorting system 25, able to remove the lightest fraction with respect to the remaining stream.

According to the solution shown in FIG. 1, the multi-stage screening system 26 allows to separate four fractions from each other, respectively F1, F2, F3 and F4, each of which is sent to a respective stage of separation according to size/density on a mechanic/pneumatic sorting system 25.

Depending on the settings of the machines and on the type of material, one or more fractions of non-ferrous metals and one or two fractions of plastic material, more or less light, will be obtained at exit from the mechanic/pneumatic sorting system 25; in any case, at exit from this last separation stage, three different fractions are recovered. Thanks to this combination of treatments of screening, size/density separation, together with the induced current separation system, it is possible to obtain a series of clean fractions of heavy or hard plastic materials P1, P2, P3, P4. The combination of heavy or hard plastic materials obtained in the first plant part 110 is symbolized by block 24 described above. From the mechanic/pneumatic sorting system 25 and separation by size/density, it is also possible to separate another quantity of non-ferrous metals, line 27.

From the process or method performed by the first plant part 110 just described, at least four fractions of materials are obtained: a fraction of light plastic materials 16, mainly comprising fibers and polyurethanes; a fraction of heavy or hard plastic materials 24; a fraction of ferrous materials 14; and one or more fractions of non-ferrous metals 20, for example aluminum and copper.

To increase the purity of the fraction or fractions of non-ferrous metals 20, for example to divide the copper from the aluminum, it is possible to provide another induced current separation system 28, by means of which a separation is obtained of the main constituent components, for example a fraction of aluminum 29 and a fraction of copper 30.

As symbolized by the arrows shown, the fraction of aluminum 29, the fraction of copper 30, the fraction of ferrous materials 14 and the fraction of non-ferrous metals 20 which have not been subjected to further treatment by the induced current separation system 28, can be introduced directly onto the market, block 31. The light plastic materials 16 and heavy or hard plastic materials 24 are subjected to other treatments in order to improve the dimensional and transport characteristics, see second plant part 210, and especially in order to make them suitable for use as additive material, usable for example as fuel or reducing agent, in iron and steel plants such as electric arc furnaces 40, blast furnaces or suchlike.

The fraction of light plastic materials 16 can be voluminous and hence difficult to transport and manage. Using a thermomechanical transformation system 32, the fraction of light plastic and fiber materials 16 is transformed into a series of briquettes or compact cylinders, which have high density and good mechanical characteristics.

The thermomechanical transformation system 32, merely by way of example, can comprise an extruder of a known type, provided for example with two screws able to compress the plastic material. The compression of the plastic material causes an increase in temperature by friction and pressure only, until the portion of thermoplastic materials present in the fraction of light plastic materials 16 softens. Using this system, it is therefore not necessary to supply heat, since it is the pressure and friction between the plastic materials that generate an increase in temperature, which can be varied by modifying the stream of material, so as to adjust it according to needs and to the material.

Optionally, during the extrusion step, binding additives can be added, such as thermoplastic materials, carbon, sawdust and other biomasses.

Depending on the use of the plastic briquettes or cylinders obtained during the previous steps, it is possible to provide a cutting and/or grinding system 33, located downstream of the thermomechanical transformation system 32 and able to obtain material in a granular form, line 38, which is used as additive material, for example to function as fuel or reducing agent 34, to be fed to the furnace 40. Preferably, a single crushing system is provided in the second plant part 210, that is, the cutting and/or grinding system 33. The cutting and/or grinding system 33 can comprise, for example, a shearing mill, of a known type and with a functioning based on a rotating cylinder equipped with blades and a grid that allows the material with a determinate size to exit.

Merely by way of example, it can be provided that the material exiting from the cutting and/or grinding system 33 has a size comprised between 2 and 6 mm or any other size suitable for its subsequent introduction into the furnace 40. Alternatively, the cylinders or briquettes obtained by the thermomechanical transformation system 32 can be used directly as additive material, to function for example as fuel or reducing agent 34, line 39.

The fraction of heavy or hard plastic materials 24 can also be sent to the grinding process, for example in the same cutting and/or grinding system 33 described above, so as to obtain a more homogeneous fraction in size.

In any case it can be provided that the fraction of heavy or hard plastics 24 is used as it is, without any further treatments, as a fuel or reducing agent.

Optionally to what has been described, moreover, in the second plant part 210, a separation system 35 can be provided to separate the chlorinated heavy plastic materials 36 from the rest, so as to reduce the percentage of chlorine in the heavy or hard plastic materials 24. From this separation process, therefore, a fraction of heavy plastic materials not containing chlorine 24' and a fraction of chlorinated heavy plastic materials 36 are obtained. The heavy plastic materials not containing chlorine 24' can also be sent to the thermomechanical transformation system 32.

The separation system 35 can be either an optical or mechanical type.

As can be seen, the heavy or hard plastic materials 24, heavy plastic materials not containing chlorine 24' or the additive material, to function for example as fuel or reducing agent 34 in granular form, can be introduced directly onto the fuel or reducing agent market, block 37.

As we said at the beginning of the description, the additive material, to function for example as fuel or reducing agent 34 obtained from light plastic materials and heavy plastic materials, can advantageously be used to at least partly replace the carbon in a furnace 40, for example an electric arc furnace 40. If granulated plastic material is used, line 38, as additive material to function for example as fuel or reducing agent 34, the granulated material can be injected pneumatically under the slag using a pneumatic lance. Alternatively, as we said, it is possible to feed the briquettes or cylinders produced directly to the furnace 40, line 39. In this case the briquettes will be loaded inside the basket that feeds the furnace.

The Table below compares the chemical composition of carbon typically used in an electric arc furnace (EAF), that is, Metallurgic coke, and its ashes, with the composition of the additive material, to function for example as fuel or reducing agent 34 (called RPF, Recycled Plastic Fuel) and its ashes.

| | | RPF* | Metallurgical coke |
|---|---|---|---|
| Elemental analysis | | | |
| Carbon (total) | % | 51.17 | 78 |
| Hydrogen | % | 6.65 | 1.1 |
| Nitrogen | % | 1.66 | 1.21 |
| Chlorine | % | 1.28 | — |
| Sulphur | % | 0.08 | 0.28 |
| Chemical analysis of ash | | | |
| Aluminum | % | 11.9 | 32.1 |
| Calcium as CaO | % | 17.9 | 0.71 |
| Copper | % | 4.6 | — |
| Iron $Fe_2O_3$ | % | 16.3 | 1.6 |
| Potassium as $K_2O$ | % | 0.57 | 0.29 |
| Magnesium MgO | % | 5.3 | 0.17 |
| Sodium as $Na_2O$ | % | 3.8 | 0.19 |
| Phosphorous as $P_2O_5$ | % | 0.78 | 0.68 |
| Silicon as $SiO_2$ | % | 37.6 | 61.1 |
| Titanium | % | 1.16 | 1 |
| Gross calorific value | [MJ/kg] | 23.74 | 28-31 |

*averaged data obtained by experimentation. They should be understood as a reference and not as a precise value.

In the furnace 40, for example an electric arc furnace, the advantages of adding polymers are not connected only to an economic saving in the at least partial replacement of carbon with a recovered material which is cheaper than carbon. If managed correctly, the injection of the polymer fraction allows to obtain very foamy slag, able to shield the arc and thus to reduce energy consumption and the problems of noise in the plant.

In applications in furnaces 40, for example electric arc furnaces, some potentially negative characteristics of the plastic fractions are easily managed. The presence of residues of ferrous metals is positive, the presence of metals such as copper and aluminum can easily be managed through the percentage of carbon replacement, hence by dilution.

Another advantageous possibility is to continuously monitor the quality parameters of the steel and slag so as to manage the stream of fuel or reducing agent, RPF (Recycled plastic fuel), indicated in block 34, which can be fed so as not to affect the quality of the steel.

The presence of chlorine in the plastics is the most critical aspect of the fuel produced. When used inside the electric arc furnace EAF, since it is possible and preferable to provide systems to abate persistent organic pollutants (dioxins, that is, PCDD, PCDF, and PCB: polychlorinated dibenzodioxins, polychlorinated dibenzofurans, polychlorinated biphenyls) and other dangerous elements inside the fume treatment system, the presence of chlorine is not discriminating. A system that is effective in drastically abating dioxins is to inject lignite, active carbons or mineral oxides or to use catalytic filters in fume treatment systems, upstream of the filtration stage.

Compared with other technologies using ASR material, therefore, the present method and the present plant advantageously produce a waste fraction that has to be sent to the dump below 5% in weight of the total: all the fractions are used inside the market or become RPF fuel.

Compared with other technologies to partly replace carbon in the electric arc furnace, the present method and the present plant produce a fraction of plastic materials that is clean of metals, thanks especially to the passes made in the first plant part 110.

Compared with other technologies to partly replace carbon in the electric arc furnace, the present method and the present plant produce a fraction that can be injected pneumatically under the slag, allowing better control of the quantity added, a better use of the material compared with loading in a basket, and prevents the possibility of being sucked into the fumes plant before it has carried out its function.

The light or heavy plastic materials, treated as described above, in granular or briquette form, can be used as fuel and at least partly to replace carbon, also in blast furnaces as well as in electric arc furnaces.

It is clear that modifications and/or additions of parts may be made to the method and plant as described heretofore, without departing from the field and scope of the present invention.

It is also clear that, although the present invention has been described with reference to some specific examples, a person of skill in the art shall certainly be able to achieve many other equivalent forms of plant, having the characteristics as set forth in the claims and hence all coining within the field of protection defined thereby.

The invention claimed is:

1. A plant for recovering and treating residues from crushing scrap, the plant comprising:
    a first plant part including:
        a granulator system that is a first grinding or crushing system, the granulator system being configured to crush the scrap and to reduce, in dry mode and without pre-screening stages, residues from crushing into a stream of granular material,
        a separation means located downstream of the granulator system and configured to extract ferrous materials, non-ferrous metals and plastic materials from said residues from crushing, the separation means comprising:
        a magnetic separation system configured to separate the ferrous materials from said stream of granular material,
        a system of separation by density configured to remove light plastic materials from said stream of granular material,
        a first induced current separator system configured to separate non-ferrous metals from the stream of granular material
        a multi-stage screening system configured to separate the stream of granular materials into a plurality of fractions of materials, and
        a mechanic/pneumatic sorting system configured to remove a lightest fraction of the plurality of fractions, separate another quantity of non-ferrous metals, and extract heavy or hard plastic materials from the stream of granular material; and
    a second plant part including:
        a means to treat and size the plastic materials, the means to treat and size the plastic materials being a second dry system for cutting and/or grinding the plastic materials to transform said plastic materials into a granular additive material usable as a reducing agent for iron and steel production plants, and
        a thermomechanical transformation system configured to transform the plastic materials into a series of briquettes or compact cylinders, said second dry system for cutting and/or grinding the plastic materials being located downstream of said thermomechanical transformation system.

2. A method for recovering and treating residues from crushing scrap by the plant according to claim 1, the method comprising:
    operating the granulator system, actuated using dry workings, to crush the scrap;
    separating the residues from crushing by the separation means to extract the ferrous materials, the non-ferrous metals and the plastic materials from said residues from crushing;
    treating and sizing the plastic materials extracted from said residues from crushing using the second dry system to cut and/or grind the plastic materials to transform said plastic materials into the granular additive material; and
    using the thermomechanical transformation system to transform the plastic materials into the series of briquettes or compact cylinders, the second dry system being located downstream of the thermomechanical transformation system.

3. The method according to claim 2, further comprising the following sequential steps:
    crushing the residues from crushing of the scrap so as to obtain the stream of granular material;
    extracting the ferrous materials from said stream of granular material by magnetic separation;
    extracting from the stream of granular material light plastic materials by separation by density;
    extracting the non-ferrous metals from said stream of granular material by induced currents; and
    extracting heavy or hard plastic materials by screening.

4. The method according to claim 2, further comprising at least a step of thermomechanical treatment of the plastic materials.

5. The method according to claim 2, wherein the plastic materials are subjected to a cutting and/or grinding step so as to obtain the briquettes or compact cylinders to feed into iron and steel plants.

6. The method according to claim 2, wherein said non-ferrous metals are treated by an induced current separation step, so as to separate the main constituent components.

7. The method according to claim 3, wherein, downstream of the step of extracting the light plastic materials and upstream of the step of extracting the non-ferrous metals, the method comprises a step of screening the stream of said granular material.

8. The method according to claim 3, wherein downstream of the step of extracting the non-ferrous metals, the method comprises a further separation step by density of the light plastic materials.

9. The method according to claim 3, further comprising a final screening step and subsequent separation stage by size/density to obtain clean fragments of a homogeneous size of heavy or hard plastic materials.

10. The method according to claim 3, further comprising a step of separating heavy chlorinated plastic materials from any remaining heavy plastic materials which do not contain chlorine.

\* \* \* \* \*